United States Patent Office 3,492,261
Patented Jan. 27, 1970

3,492,261
SOLUTIONS OF POLYMERIC ULTRAVIOLET LIGHT BARRIER COATINGS
Raymond H. Young, Jr., East Longmeadow, Saul M. Cohen, Springfield, Albert H. Markhart, Wilbraham, and Irving Serling, Springfield, Mass., assignors to Monsanto Company, St. Louis, Mo., a corporation of Delaware
No Drawing. Original application July 8, 1965, Ser. No. 470,572, now Patent No. 3,444,129. Divided and this application Nov. 20, 1968, Ser. No. 777,472
Int. Cl. C08g 39/04; C09d 3/64
U.S. Cl. 260—30.4        14 Claims

ABSTRACT OF THE DISCLOSURE

Disclosed herein are film forming solutions of rearrangeable polyesters which are the polymeric reaction product of an aromatic dihydric compound and an aromatic dicarboxyl compound. The preferred dihydric compounds are the ester derivatives of 4,4-bis(4'-hydroxyphenyl)pentanoic acid wherein there is at least one unsubstituted position ortho to the aromatic hydroxyl group. Substrates coated with films formed from solutions of the polyesters of this invention are protected against ultraviolet light.

CROSS REFERENCE TO RELATED APPLICATIONS

This application is a division of copending application Serial No. 470,572, filed July 8, 1965, now U.S. Patent 3,444,129.

BACKGROUND OF THE INVENTION

Field of the invention

The present invention relates to solutions of aromatic polyesters capable of absorbing ultraviolet light and acting as a barrier to ultraviolet light. More particularly the present invention relates to solutions of aromatic polyesters which can be coated onto a substrate and dried to transparent films and which will undergo rearrangement in the presence of ultraviolet light to form a transparent compound which is stable to and will act as a barrier to ultraviolet light.

Description of the prior art

Ultraviolet light is that portion of the spectrum just beyond violet on the short wave length side, generally from 180–390 m$\mu$. Ultraviolet light is emitted by sunlight, carbon arc lamps, mercury vapor lamps, tungsten arc lamps and other light sources. The invisible rays from the ultraviolet region can induce chemical activity which is both beneficial and/or adverse. Some of the adverse effects of ultraviolet light are degradation of synthetic resins, such as polyvinyl chloride, used in exterior structures and articles exposed to sunlight, including rear windows used in convertible automobiles and the like; fading or discoloration of white or dyed synthetic and natural textiles; fading or deterioration of cellulosic materials such as wood, paper, and the like, tarnishing and discoloration of metals; fading of black and white and colored photographic prints; fading and discoloration of paints, etc. Indeed, the full list of adverse effects of ultraviolet light is too numerous to be set forth here.

Some aromatic polyesters currently available afford some partial degree of protection. These materials are inadequate by virtue of the fact that they either have undesirable color or they are not opaque to ultraviolet light, or more likely, they themselves are subject to ultraviolet light degradation.

Some polymeric products have shown properties which indicate that they would function as good ultraviolet barriers, however, the use of these products is not practical because of their poor solubility characteristics. They cannot be dissolved in solvents in sufficient quantity which would allow them to be coated onto substrates. Likewise, they cannot be applied in a molten state or extruded onto substrates because of their high melting point, etc.

SUMMARY OF THE INVENTION

The present invention is directed to solutions of rearrangeable polyesters which are soluble in organic solvents at room temperature and which are the polymeric reaction product of an aromatic dihydric compound and an aromatic dicarboxyl compound. The preferred dihydric compounds are the ester derivatives of 4,4-bis(4'-hydroxyphenyl) pentanoic acid, wherein there is at least one unsubstituted position ortho to the aromatic hydroxyl group. The organic solvent medium is a volatile organic solvent having a boiling point of about 40° C. to about 200° C.

The polymeric solutions of the present invention can be coated onto substrates and dried into thin films which rearrange under the influence of ultraviolet light to afford an excellent barrier against the harmful effects of ultraviolet light.

The solutions of the rearrangeable polymers of the present invention fill a long standing need in the prior art by providing a rearrangeable polymeric ultraviolet light barriers which are soluble in organic solvents at room temperature and which can be coated onto substrates to afford a barrier for the harmful effects of ultraviolet light.

The primary object of this invention is to provide coating composition which will act as barriers to ultraviolet light.

Another object is to provide soluble, essentially linear, non-cross-linked polyesters, the thin films of which are transparent and which will rearrange in the presence of ultraviolet light to form a clear, stable barrier against ultraviolet light.

Another object of this invention is the provision of a method of preparing solutions of aromatic polyesters which act as a barrier against ultraviolet light.

The foregoing and other objects are attained by preparing a soltution of a rearrangeable polyester having a molecular weight in the range of from 3,000 to 200,000 which comprises the polymeric reaction product of:
(A) from 10 to 100 parts, based on a total of 100 parts of (A) and (C), of an aromatic dihydric compound having at least one unsubstituted position ortho to an aromatic hydroxyl group wherein the aromatic dihydric compound corresponds to the general structural formula:

$$HO-\underset{\underset{\underset{R_2}{\overset{|}{C=O}}}{\overset{|}{\underset{R_1}{\overset{|}{C}}}}}{\bigotimes}-OH \qquad (I)$$

wherein R is selected from the group consisting of hydrogen and alkyl groups of from 1 to 6 carbon atoms, $R_1$ is an alkylene group of from 1 to 10 carbon atoms and $R_2$ is selected from the group consisting of amino, alkoxys of from 1 to 18 carbon atoms, $$-OR_4; -O-\left(\!\!R_3OR_3\!\!\right)_{\!n}\!\!-H; \; \overset{R_5}{\underset{|}{N}}R_5$$

and $-N=R_6$, wherein each $R_3$ is an independently selected alkylene group of from 1 to 10 carbon atoms, $R_4$ is an aryl group of from 6 to 10 carbon atoms, each $R_5$ is independently selected from the group consisting of hydrogen, alkyls of from 1 to 6 carbon atoms and aryls of from 6 to 10 carbon atoms, $R_6$ is a divalent aliphatic radical of from 2 to 10 carbon atoms, and $n$ is an integer of from 1 to 8; and (B) at least one aromatic dicarboxyl compound capable of esterification, which is selected from the group consisting of aromatic dicarboxylic acids and acid halide derivatives thereof which are selected from the group consisting of unsubstituted and halo and alkyl substituted (1) terephthalic acid, isophthalic acid, diphenic acid, binaphthyl dicarboxylic acid;

(2) the acid halides of the foregoing acids; and (3) acids and acid chlorides which correspond to the general structural formula:

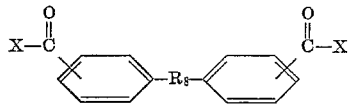

(II)

where X is selected from the group consisting of hydroxyl or halide and $R_8$ is selected from the group consisting of methylene, carbonyl, oxygen, sulfur, sulfone, isopropylidene, isobutylidene and ethylidene; and (C) from zero to 90 parts, based on a total of 100 parts of (A) and (C), of an aromatic dihydric compound selected from the group consisting of (1) an aromatic dihydric compound having at least one unsubstituted position ortho to an aromatic hydroxyl group, wherein the aromatic dihydric compound corresponds to the general formula:

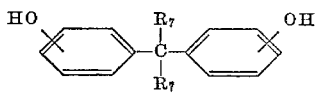

(III)

wherein each $R_7$ is independently selected from the group consisting of hydrogen and alkyl groups of from 1 to 8 carbon atoms; and (2) a dihydric phenol, the total quantity of (A) and (C) being substantially stoichiometrically equivalent to the quantity of (B).

Examples of aromatic dihydric compounds corresponding to structural Formula I above are: 4,4-bis(4'-hydroxyphenyl)pentanoic acid; 5,5-bis(4'-hydroxyphenyl)pentanoic acid; 4,4-bis(4'-hydroxyphenyl)hexanoic acid; 4,4-bis(4'-hydroxyphenyl)heptanoic acid; 4,4-bis(4'-hydroxyphenyl)octanoic acid 4,4-bis(4'-hydroxyphenyl)nonanoic acid; 4,4-bis(4'-hydroxyphenyl)decanoic acid; 5,5-bis(4'-hydroxyphenyl)hexanoic acid; 5,5-bis(4'-hydroxyphenyl)heptanoic acid; 5,5-bis(4'-hydroxyphenyl)nonanoic acid; 5,5-bis(4'-hydroxyphenyl)decanoic acid; 6,6-bis(4'-hydroxyphenyl)decanoic acid, etc.

Expecially useful are the esters of the above mentioned acids such as the methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, esters of 4,4-bis(4'-hydroxyphenyl)pentanoic acid, 5,5-bis(4'-hydroxyphenyl)pentanoic acid, etc.

Other esters include those which are the reaction product of the above mentioned acids and hydroxy bearing compounds such as 2-ethoxyethanol, 2-butoxyethanol, 2-hexoxyethanol, diethylene glycol monobutyl ether, etc. It should be obvious to one skilled in the art that some of the ester derivatives may also contain other type linkages in the aliphatic chain.

Other compounds which correspond to structural Formula I and which are useful in the practice of this invention include N,N-dimethyl - 4,4-bis(4'-hydroxyphenyl) pentanamide; N, N-diethyl - 4,4 - bis(4'-hydroxyphenol) pentanamide; N-methyl, N-propyl-4,4 - bis(4'-hydroxyphenyl)pentanamide; N,N - dimethyl-4,4-bis(4'-hydroxyphenyl); decanamide; N,N-cyclohexyl - 4,4 - bis(4'-hydroxyphenyl)pentanamide; N,N - dicyclohexyl-4,4-bis(4'-hydroxyphenyl)hexanamide, etc.

Compounds corresponding to structural Formula I wherein $R_2$ is an aryl group would include phenyl-4,4-bis(4' - hydroxyphenyl)pentanoate; tolyl - 4,4-bis(4'-hydroxyphenyl)pentanoate; phenyl-5,5-bis(4'-hydroxyphenyl)decanoate, etc.

Especially preferred are the derivatives of 4,4-bis(4'-hydroxyphenyl)pentanoic acid such as the esters and amides which promote the solubility of the resultant polyester.

In combination with the aforementioned aromatic dihydric compounds one may use from zero to 90 parts, based on a total of 100 parts of total aromatic dihydric compound of a dihydric compound of the type represented by Formula III above.

Examples of the aromatic dihydric compounds represented by the general structural Formula III would include the bisphenols such as bisphenol-A or bisphenol-B on their derivatives. This group may include such compounds as 2,2-bis(4'-hydroxyphenyl)propane; 2,2-bis(4'-hydroxyphenyl)butane; 2,2 - bis(4' - hydroxyphenyl) - 4-methylpentane; and methyl, ethyl, propyl, butyl, amyl and hexyl esters of 2,2' - bis(4' - hydroxyphenyl) - butyrate. The dihydric phenol portion may be represented by the following compounds: resorcinol, 2,4-dihydroxyacetophenone, 2-methylhydroquinone, 5-methylresorcinol, 2-methylresorcinol, catechol, hydroquinone, 4-chlororesorcinol, 4-ethylresorcinol, 2-benzylresorcinol, 5-propylresorcinol, 2-hexylresorcinol.

The dihydric phenolic compound may also be a fused aromatic compound such as represented by dihydroxynaphthalene, dihydroxyanthracene, and dihydroxyanthraquinones. Compounds selected from these three groups must have at least one unsubstituted position ortho to at one of the phenolic hydroxyl groups and said phenolic hydroxyls must be capable of bifunctional esterification to produce high polymers.

The aromatic dicarboxyl compound can be an aromatic dicarboxylic acid or an aromatic dicarboxylic acid halide or other ester-forming derivatives of the dicarboxylic acids, such as mixed anhydrides and esters of these acids, which are free of functional groups which would interfere with or compete with the bifunctional esterification reaction. These compounds are represented by terephthalic acid and isophthalic acid, halophthalic acids such as chlorophthalic, chloroisophthalic, chloroterephthalic, bromophthalic, bromoisophthalic, bromoterephthalic, alkyl substituted phthalic acids such as methyl phthalic, ethyl phthalic, tertiary butylisophthalic, 2,5-dimethylterephthalic acid, etc. Other examples would include tetrachloroterephthalic acid, diphenic acid, binaphthyl dicarboxylic acid and the acid chlorides and trifluoroacetic mixed anhydrides and methyl and phenyl esters of all the foregoing.

Especially preferred are the acid chlorides because of their faster rates of reactions and availabiilty.

Equally useful are acids or acid chlorides which correspond to the general structural formula:

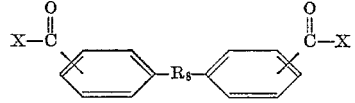

(II)

where X may be hydroxyl or halide and $R_8$ may be methylene, carbonyl, oxygen, sulfur, sulfone, isopropylidene, isobutylidene, ethylidene. Examples of compounds which correspond to this structure and which are useful in the practice of this invention includes: oxydibenzoic acid, butylidene dibenzoic acid, thiodibenzoic acid, isopropylidene dibenzoic acid, ketobenzoic acid, sulfodibenzoic acid, methylene dibenzoic acid, ethylidene dibenzoic acid.

The resultant polyester is dissolved in an organic liquid solvent, the polyester being present in an amount of 0.5% to about 75% by weight of the total weight of polyester and solvent. The organic solvent is selected from the groups consisting of aliphatic and aromatic halogenated hydrocarbons, aromatic and aliphatic ketones, aromatic hydrocarbons, disubstituted acetamides, aromatic esters, aliphatic and aromatic amines, aromatic ethers, aliphatic cyclic ethers, phenol, aliphatic and alicyclic sulphoxides and sulphones, and unsaturated alkyl aromatics. The polyester solution is applied to the substrate to be protected and the solvent is evaporated by any of the conventional means such as air drying, flashing the solvent off at high temperatures or drying in vacuum.

Upon exposure to ultraviolet light the exposed outer surface of the polyester rearranges to form a coating of poly(orthohydroxybenzophenone) units or analogs thereof, which is capable of acting as a stable barrier to ultraviolet light. Thus, it will be seen that to have this unique property of opacity to and stability to ultraviolet light the poly(ortho-hydroxybenzophenone) must be comprised of two aromatic rings with one ketone group between them and at least one hydroxyl group in a position ortho to the ketone.

Coatings of these polyesters only rearrange on a thin layer of the surface exposed to ultraviolet light, for as the rearranged structures are formed on exposure, they block any further transmission of ultraviolet light into the coating. It is therefore the unique property of these coatings to replenish the poly(orthohydroxybenzophenones) as these rearranged materials are gradually worn away by various conditions such as abrasion or ultimate chemical or physical degradation. In effect then, the coatings comprise a reservoir system wherein a surface exposed to ultraviolet light forms a continuous thin portion of rearranged polymer both stable to and opaque to ultraviolet light while the remaining polyester is available to regenerate or renew a rearranged portion when and if the protective portion is eroded or loses its efficiency.

It is to be noted that whereas the rearranged portion is usually the outer surface of the coating on most substrates, the rearranged material may be the inner or under surface of the coating if the coating is placed on the inner side of a substrate such as glass, transparent (to some degree) to ultraviolet light. The polyester portion of the coating in itself blocks ultraviolet light below 300µ while the rearranged portion extends this range to above about 400µ. This screening effect may of course overlap somewhat, and, in the case of certain rearranged materials, may cut off light up to 450µ.

It appears that even a monomolecular film of the rearranged polymer will afford protection of a substrate from ultraviolet light as this is substantially a surface phenomenon. The polyester portion of the coating may vary in thickness depending on the substrate to be protected as well as the method used in applying the polyester to the substrate.

The polyesters are preferably prepared according to one of the well known interfacial polymerization techniques such as the method set forth by W. M. Eareckson, III in the "Journal of Polymer Science," vol. XL, pages 399–406 (1959). It is thereby convenient to polymerize rapidly at low temperatures in order to obtain colorless, soluble products.

Another equally useful polymerization procedure is the low temperature solution polymerization as described by P. W. Morgan in "Polymer Preprints," vol. 5, Number 1, page 225, American Chemical Society, Division of Polymer Chemistry, April 1964.

The following examples are given in illustration of the invention and are not intended as limitations thereof. All parts and percentages are by weight unless otherwise specified.

Example 1

The polyester is prepared according to the following procedure:

Charge A:
(1) 150 ml. water
(2) 15 ml. of 10% sodium lauryl sulfate solution in water
(3) 2.0 g. sodium hydroxide pellets
(4) 100 g. chopped ice
(5) 4 drops antifoam Charge B:
(6) 0.025 mole of a 1:1 molar mixture of isophthaloyl chloride and terephthaloyl chloride (I/T mixture)
(7) 0.025 mole of the 2 butoxyethyl ester of 4,4-bis-(4'-hydroxyphenyl) pentanoic acid
(8) 75 ml. chloroform Charge A is placed in a Waring Blendor and the speed of the stirring regulated by a Powerstat. The solution is cooled to 3° C by the addition of ice and the stirring increased to the maximum. Charge B is then added quickly in one portion. If the temperature of the polymerization rises to 7° C., additional ice is added. The emulsion is stirred for five minutes. Then the solid polymer is isolated either by pouring the emulsion into 1 liter of methanol or by adding methanol to the emulsion until coagulation occurs. The polymer is wshed three or four times in the Waring Blendor with hot water, and finally it is collected on a Buchner funnel where it is washed with methanol. The polyester is then dried in a vacuum oven at 55° C/15 mm. for 15–20 hours. A white product is obtained in a 68% yield and a 0.5% solution in a 75:25 by volume mixture of phenol and tetrachlorethane has an inherent viscosity of about 0.63 at 30° C. Similar preparations in chloroform or methylene chloride also yield polymers having inherent viscosities of over 0.90 which are approximately equivalent to a molecular weight of about 40,000 to 50,000. The softening point of these latter polymers is about 80–95° C.

A 4% by weight solution in chloroform of one of these I/T polyesters of the 2-butoxyethanol ester of 4,4-bis(4'-hydroxyphenyl)pentanoic acid having an inherent viscosity of 0.66 is prepared. This solution is cast on a portion of a color photoprint (Kodacolor) and allowed to dry at room temperature, forming a film with a thickness of 0.1 mil.

Similar color photoprints are partially coated with films ranging from 0.1 to 0.45 mil in thickness. The prints are then irradiated with a 450 watt Hanovia ultraviolet lamp at a distance of 25 cm. The unprotected portions of the prints fade rapidly, with the various blue dyes being the first to show signs of fading. The unprotected portion is bleached to a red-brown color after only 4½ hours. After 171 hours, that portion protected with the polyester coating with a thickness of 0.1 mil is just beginning to show fading of the blue component.

To compare the effectiveness of these polyphenyl esters with other polymers, a 1.5 mil film of poly(ethylene terephthalate) is placed over a portion of the color prints. Within 28 hours of exposure, as above, fading is noticed in the protected colors of the photoprints and the film itself becomes frosted and opaque.

Other comparisons are carried out using commercial acrylic resins containing 5%, by weight of resin, of standard monomeric ultraviolet absorbers. Film thicknesses of 2.0 mils on the photos show that fair protection of the colors is possible for some period. However, the acrylic films become badly cracked and blistered. When these acrylic coatings are coated onto color photoprints at a thickness of 0.3 mil, fading occurs under the protected portion as rapidly as it does on the unprotected portion of the photo.

Example 2

This polyester is prepared according to the following procedure for solution polymerization.

Charge A:
(1) 2.14 g. butyl ester of 4,4-bis(4'-hydroxyphenyl)-pentanoic acid
(2) 2.06 g. resorcinol
(3) 2.54 g. isophthaloyl chloride
(4) 2.54 g. terephthaloyl chloride
(5) 90 ml. methylene chloride Charge B:
(6) 7.2 ml. triethylamine Charge A is placed in a 250 ml. Erlenmeyer flask equipped with a water condenser and cooled ot 10° C. Charge B is added slowly to the cooled A portion. The solution is agitated with a magnetic stirrer for 4 hours during which time the temperature of the reaction mixture is allowed to rise to 25–30° C.

The resultant polymer is isolated by precipitating the polymer solution into an excess of methanol. The resin is washed once with methanol, twice with water and dried in a vacuum oven for 15 hours at 70–80° C. The product yield is about 98% and the polymer has an inherent viscosity of 0.91 when run according to the procedure of Example 1.

A solution of the polymer in methylene chloride containing a small amount of cyclohexanone (0.158 part in one part) is used to form a 1 mil thick coating on a portion of coated paperboard coated with fluorescent dye paints. The coated paperboard is placed approximately 25 centimeters below a 450 watt U.V. lamp. The unprotected portion of the fluorescing paints loses its fluorescence within 6 minutes while the filorescence of the protected portions remains essentially unchanged even after 30 hours. The colors in the paints also fade on the unprotected portions while protection is greater than 90% for the coated portion.

Rigid polyvinyl chloride sheets coated with about a 1.0 mil thickness of this polyphenyl ester show very little or no degradation after being irradiated by a 450 watt U.V. lamp for 179 hours. Uncoated, unstabilized polyvinyl chloride, and even uncoated polyvinyl chloride stabilized with monomeric U.V. absorbers, begins to degrade after 2 hours of irradiation under this lamp.

Examples 3 to 22 illustrate the wide variety of aromatic dihydric compounds that one may use in the practice of this invention as well as the wide range of proportions of aromatic dihydric compounds to those dihydric compounds illustrated by Formula I. The aromatic dicarboxy portion was a 1:1 mixture of isophthalic and terephthalic acid chlorides and was kept essentially constant in these examples. The results are tabulated in Table I. All ratios for the dihydric compounds are given in moles. The inherent viscosities were run according to the procedure of Example I using a 0.5% solution in a 75:25 by volume mixture of phenol and tetrachloroethane at 30° C.

TABLE 1.—EXAMPLES 3–22

| Ex. | Dihydric Compound | Percent Yield | Inh. Visc. |
|---|---|---|---|
| 3 | Ethyl-4,4-bis(4'hydroxyphenyl) pentanoate. | 92 | 0.77 |
| 4 | Butyl-4,4-bis(4'hydroxyphenyl) pentanoate. | 87 | 0.59 |
| 5 | Lauryl-4,4-bis(4'-hydroxyphenyl) pentanoate. | 83 | 0.73 |
| 6 | N,N-pentamethylene-4,4-bis(4'-hydroxyphenyl)pentanamide. | 72 | 0.56 |
| 7 | 75/25 bisphenol-A/butyl-4,4-bis(4'-hydroxyphenyl)pentanoate. | 87 | 0.59 |
| 8 | 75/25 bisphenol-A/lauryl-4,4-bis(4'-hydroxyphenyl)pentanoate. | 69 | 0.69 |
| 9 | 75/25 2,2-bis(4'-hydroxyphenyl)butane/butyl-4,4-bis(4'-hydroxyphenyl) pentanoate. | 94 | 0.83 |
| 10 | 75/25 2,2-bis(4'-hydroxyphenyl)butane/lauryl-4,4-bis(4'-hydroxyphenyl) pentanoate. | 94 | 0.83 |
| 11 | 90/10 bisphenol-A/ethyl-4,4-bis(4'-hydroxyphenyl)pentanoate. | 95 | 0.05 |
| 12 | 75/25 bisphenol-A/ethyl-4,4-bis(4'-hydroxyphenyl)pentanoate. | 84 | 1.15 |
| 13 | 25/75 bisphenol-A/ethyl-4,4-bis(4'-hydroxyphenyl)pentanoate. | 98 | 1.73 |
| 14 | 25/75 bisphenol-A/2-butoxyethyl ester of 4,4-bis(4'-hydroxyphenyl)pentanoic acid. | 85 | 0.54 |
| 15 | 50/50 bisphenol-A/2-butoxyethyl ester of 4,4-bis(4'-hydroxyphenyl)pentanoic acid. | 74 | 0.64 |
| 16 | 50/50 bisphenol-A/4,4-bis(4'-hydroxyphenyl) pentanoic acid. | 80 | 0.21 |
| 17 | 98/2 bisphenol-A/4,4-bis(4'-hydroxyphenyl)pentanoic acid. | 90 | 0.16 |
| 18 | 91/9 bisphenol-A/4,4-bis (4'-hydroxyphenyl)pentanoic acid. | 89 | 0.15 |
| 19 | 85/15 bisphenol-A/butyl-4,4-bis(4'-hydroxyphenyl)pentanoate. | 73 | 1.09 |
| 20 | 25/75 resorcinol/butyl-4,4-bis(4'-hydroxyphenyl)pentanoate. | 95 | 0.90 |
| 21 | 90/10 resorcinol/butyl-4,4-bis(4'-hydroxyphenyl)pentanoate. | 93 | 0.85 |
| 22 | 75/25 2-methyl resorcinol/butyl-4,4-bis (4'-hydroxyphenyl)pentanoate. | 91 | 0.57 |

In Examples 3 to 22 the aromatic dihydric compounds which correspond to Formula I are varied from 2 parts (Example 18) to 100 parts (Examples 3–6) out of a possible total of 100 parts to illustrate the wide range in proportions that one might use in the practice of this invention.

Examples 7–19 illustrate the use of compounds which correspond to the general structure represented by Formula I in combination with (1) compounds represented by Formula II (Examples 7 to 19 ) and (2) dihydric phenols (Examples 20–22).

The inherent viscosities reflect the wide range of molecular weights that one might achieve in the practice of this invention. An inherent viscosity of 0.15 (cf. Example 18) corresponds to a molecular weight of about 2,000 while the value of 1.73 (cf. Example 13) would indicate a molecular weight of about 200,000.

Examples 23 to 34 are set forth in Table II to illustrate the wide range of dicarboxy compounds that one may use in the practice of this invention as well as the range in proportion of isophthalic to terephthalic acids. Ratios of reactants are given in terms of molar ratios.

TABLE II.—EXAMPLES 23 TO 34

| Example | Dihydric Compound | Dicarboxyacid Chloride | Percent Yield | Inh. Visc. |
|---|---|---|---|---|
| 23 | Ethyl-4,4-bis(4'hydroxyphenyl) pentanoate. | Terephthalic | 96 | 1.9 |
| 24 | Butyl-4,4-bis(4'-hydroxyphenyl) pentanoate. | Isophthalic | 99 | 1.5 |
| 25 | Ethyl-4,4-bis(4'-hyroxyphenyl) pentanoate. | 1:1:1 isophthalic/terphthalic/oxydibenxoyl. | 87 | 0.6 |
| 26 | 75/25 resorcinol/butyl-4,4-bis(4'-hydroxyphenyl) pentanoate. | 2-methoxyethanol ester of trimellitic. | 34 | 0.12 |
| 27 | do | 1/1 isophthalic/terephthalic. | 92 | 1.10 |
| 28 | Butyl-4,4-bis(4'-hydroxyphenyl) pentanoate. | 60/40 tert. butyl isophthalic/terephthalic. | 91 | 0.6 |
| 29 | do | 1/1 isophthalic/methyl-terephthalic. | 93 | 0.7 |
| 30 | do | Oxydibenzoyl | 95 | 1.1 |
| 31 | do | 1/1 diphenic acid/isophthalic. | 82 | 0.5 |
| 32 | Ethyl-4,4-bis(4'-hydroxyphenyl) pentanoate. | Sulfodibenzoyl | 85 | 0.7 |
| 33 | do | Ketodibenzoyl | 98 | 0.2 |
| 34 | do | Isobutylidene diphenol | 95 | 0.9 |

Solutions of polyesters prepared above were used to coat many varied and diverse substrates in order to study the degree of protection that these polymers afford against the degradation caused by ultraviolet light. A listing of these are tabulated in Table III. The examples referred to are the polyesters prepared in the foregoing examples. All U.V. stability tests are conducted by placing the test specimens about 25 cm. away from a 450 watt U.V. lamp and observing the degradation of the test specimen as a function of time.

cycle. This is essentially according to ASTM method D-822-46T.

Testing in a Weatherometer, being a standard accelerated method of determining the life of a coating, is especially effective in studying the efficiency of these polyester materials in the weathering and subsequent "healing" (replacement of the degraded, worn or washed-away rearranged surface by new U.V. stable materials from the polyester reservoir).

TABLE III.—RESULTS OF U.V. STABILITY TESTS

| Polyester Example | Solvent | Substrate* | Exposure time (Hrs.) | Results on substrate | |
|---|---|---|---|---|---|
| | | | | Protected | Unprotected |
| 1 | Methylene chloride | Kodacolor prints | 7 | 90% color retention. | Colors faded. |
| 1 | Chloroform | Color transparency slides. | 48 | do | Do. |
| 3 | Ethylene chloride | Undyed cotton fabric | 85 | Unchanged | Yellow-tan |
| 4 | do | Polyvinyl chloride | 96 | do | Brown. |
| 5 | do | Fluorescent paint | 47 | do | Loss of fluorescence. |
| 5 | Toluene | Fluorescent dyes | 30 | do | Do. |
| 7 | Cyclohexanone | Polyethylene | 40 | do | Film disintegrated. |
| 8 | Ethylene chloride | Polyvinyl chloride | 96 | do | Yellow-opacity. |
| 8 | Dioxane | Dyed cotton fabric | 85 | do | Faded. |
| 9 | Methylene chloride | Varnished wood | 60 | do | Varnished disintegrated. |

*The coatings range from 0.1 to 0.3 mil thick.

Further ultraviolet stability tests are conducted by protecting the substrates (listed in Table IV) with a 1.0-mil overlaid film of polyester or by coating the substrates with solutions of Examples 1, 3–5, 7–9, 14, 20 and 22. Irradiation is under a 450-watt U.V. Lamp at a 25-cm. distance.

TABLE IV.—U.V. STABILITY OF SYNTHETIC POLYMERS

| Substrates | Exposure time (hrs.) | Results on substrate | |
|---|---|---|---|
| | | Protected | Unprotected |
| Cellulose acetate butyrate | 250 | Unchanged | Yellow. |
| Cellulose nitrate | 300 | do | Dark yellow, opaque. |
| Nylon | 96 | do | Do. |
| Polycarbonate (U.V. stabilized) | 96 | do | Yellow. |
| Polyethylene terephthalate | 96 | do | Opaque, brittle. |
| Poly(methylmethacrylate) | 96 | do | Yellow. |
| Polyacrylonitrile | 96 | do | Brown. |
| Poly(styrene) | 96 | do | Yellow. |
| Poly(vinyl chloride/vinylidene chloride) | 96 | do | Brown. |
| Poly(propylene) | 96 | do | Crumbled. |
| Poly(vinyl acetate) | 96 | do | Tan, brittle. |
| Poly(vinyl butyral) | 96 | do | Do. |

Additional exposure tests are conducted in a Weatherometer on the substrates listed in Table V which are protected with a 1-mil coating of the polyesters prepared in Examples 1, 3–4, 7–9, 14, 20 and 22 Results of the tests are listed in Table V.

TABLE V.—WEATHEROMETER TESTS

| Substrate | Exposure time (hrs*) | Results on substrate | |
|---|---|---|---|
| | | Protected | Unprotected |
| Rigid poly(vinyl chloride) | 456–1,085 | Unchanged | Yellow film |
| Pine | 305.456 | Minute cracks, still glossy. | Degradation of wood. |
| Cedar | 150–305 | Unchanged | Do. |
| Copper | 150 | do | Tarnished badly. |
| Brass | 150 | do | Do. |
| Muntz metal | 150 | do | Do. |

*Range for those polyesters tested: where only one value is given it represents the minimum protection time for those polyesters used.

The Weatherometer is an apparatus exposing the test panels by rotating them around a carbon arc lamp. One hour in the Weatherometer is considered approximately equivalent to about one day of sunshine in June. This device has the further weathering effect of spraying the panels with water for about 18 minutes of every 2-hour Clear coatings of these rearranged polyesters on cedar shakes and redwood panels as well as copper and brass plates were also exposed in a Weatherometer for as long at 2100 hours. The protective effect of these coatings was still substantial at this point while unprotected wood panels were badly bleached and showed signs of cracking and the metal blanks were discolored and tarnished.

Copper, brass and Muntz metal, coated with the polyester solution as those in Table V, which also contained 1.5% by weight of benzotriazole were exposed to salt fog (5% salt) for 30 days with little or no adverse effect while unprotected samples rapidly corroded.

The polyester solutions may be applied by knife, spray, flow coater, curtain coater, dip or brush to give a full even coating. A good non-brushing solvent blend for use on bright metal surfaces is methylene chloride-cyclohexanone, 85/15. On these bright metal substrates, the addition of 1.5% benzotriazole (based on resin weight) passivates the surface against salt corrosion.

Free films may also be cast from solutions of these polyesters. These films can be conveniently laminated on substrate surfaces with heat and pressure. Excellent adhesion to plasticized polyvinyl chloride sheet has been obtained by using an electrically heated press, the sandwich to be laminated being subjected to 130 p.s.i.g. at 345–350° F. for two minutes. A 0.5 mil thick film of rearranging polyester so laminated produced excellent protection from ultraviolet light.

For adhesion to rigid polyvinyl chloride, 15:85 cyclohexanone/methylene chloride, and 95:5 tetrahydrofuran/dimethylacetamide, have been useful. On wood, toluene has been adequate. As soon as the solvent evaporates, the coated articles may be exposed to use since no cure is involved.

These polyesters are also useful as coatings on glass or plastic bottles to protect or shield the contents from the harmful effects of U.V. light. Films having a thickness of 0.5 mil on glass bottles should protect the contents (such as pharmaceuticals) which would be inactivated by U.V. light in the range of 200 to about 400 m$\mu$. Thin coatings on glass-paned windows should also give useful protection to items in the interior such as fabrics, drapes and rugs.

Example 35

The rearrangement of the polyester to poly(orthohydroxybenzophenones) was studied in the following manner.

A 0.50 mil film of the polyester of Example 1 is cast on glass from a 10% solution in toluene. The clear, transparent film is transferred to a standard IR cardboard specimen holder. The film is placed directly below a Hanovia 100-watt U.V. lamp and after various time increments, IR spectra of the film are obtained. These spectra are obtained both for the exposed side and for the unexposed side of the irradiated film by means of an attenuated total reflectance (ATR) attachment for a Beckman IR–5 spectrophotometer. Proof of the rearranged structure is obtained by measurement of the bands in the region $2.0\mu$ to $15\mu$.

The absorbance of the new benzophenone carbonyl peak formed at $6.12\mu$ by the irradiation is divided by the C–H absorbance at $3.35\mu$ using a standard baseline method to give a relative value for the amount of carbonyl present. The initial value of zero of this proportion, gradually grows to 0.15 on 15.5 hours of irradiation, to 0.40 after 70 hours and starts to level off at approximately 0.58 after about 175 hours. This levelling is believed due to the fact that the surface polymer molecules have rearranged to ultraviolet absorbing groups, thus prohibiting any further ultraviolet radiation from penetrating the film. No changes from the original polyester film are found on the unexposed side.

The U.V. lamp used for irradiation in this example is a Hanovia 100-watt high pressure quartz mercury-vapor lamp, model 608A. The lamp is 25 cm. above the film. The approximate intensity of the ultraviolet radiation at 336 m$\mu$ reaching the film is 100 microwatts/cm.$^2$. The total output of U.V. radiation from the lamp is 4.64 watts which represents 40.3% of the total radiation emitted, the remaining 59.7% consists of visible and infrared radiation.

The rearranged polyester is stable to ultraviolet radiation without undergoing apparent chain scission or crosslinking for at least 1,000 hours under the above conditions. Samples so exposed are found still soluble in chloroform and showed no appreciable change in viscosity. Additional proof of the rearranged structure is obtained by measuring the band intensities with an ultraviolet spectrophotometer.

When a film of poly(bisphenol-A carbonate) is similarly irradiated for 800 hours, an IR spectrum shows no new bands in the region 5.8–6.2$\mu$. Obviously, all aromatic polyesters do not undergo this rearrangement, but rather they require a judicial selection of monomers and polymerization conditions. An aromatic polyester of 2,2-bis(3′, 5′ - dichloro - 4′ - hydroxyphenyl)propane and isophthalic acid similarly fails to show evidence of rearrangement on irradiation.

In general, both the adhesion ability and the abrasion resistance of these coatings has been surprisingly satisfactory. It has been found especially advantageous to prepare copolymers of these polyesters using dihydric materials which correspond to Formula I alone or in combination with the compounds represented by Formula II and with dihydric phenol types and at least one di-acid. In this manner, it is possible to obtain polyesters combining desirable solubility of solution, with properties such as film clarity and film strength. The ester derivatives of Formula I are especially useful in enhancing the solubility of the polymers.

Certain polyesters which are not rearrangeable such as poly(bisphenol-A carbonate) may give some protection at wave lengths below about 300 m$\mu$ because of their aromatic nature. However, they give no protection above about 300 m$\mu$ and do degrade at higher ultraviolet wave lengths. In addition, because of their inability to rearrange, they lack the ability to renew themselves. Polystyrene is known also to furnish some protection against U.V. light below about 300 m$\mu$. However, it is not stable to U.V. light above 300 m$\mu$ and so its protective action is short lived. In contrast thereto, poly(methyl methacrylate) doesn't protect substrates from U.V. light but is relatively stable thereto. The present polyesters are superior to a combination of the best ultraviolet properties of these two receding materials.

Other nonrearrangeable polyesters have been formed using 2,2-bis(3′,5-dimethyl-4′-hydroxyphenyl)propane as the phenolic material with a mixture of isophthalic and terephthalic acids, as well as polyesters derived from substituted fumaric acid with bisphenol-A. These do not contain an unsubstituted position ortho to the hydroxy group.

Certain monomeric materials may be usable but preferably only in small amounts because they may adversely affect the solubility of the products formed or inhibit the polymerization by limiting the products to low molecular weight. Such materials include ortho-phthalic acid and catechol or materials containing crosslinkable groups.

These polymeric U.V. stabilizers have also been incorporated into other polymer substrates by admixture with the substrate material. For example, 0.5% by weight of the polymer was incorporated into both plasticized and unplasticized polyvinyl chloride which was thereupon formed into sheets for testing. However, it was found that such admixture was inefficient in protecting from U.V. light when compared to the effect of coating the substrate. Apparently the ease of rearrangement in the coating surface and the concentrated continuous layer of rearranged material on the surface of the coating is the reason why a coating is superior to the use of the dispersed polymer.

The polymerization of these polyesters is conducted with a non-reacting organic liquid which is a solvent for both the monomers used and the polymers produced in order to achieve the high molecular weights desired. When using interfacial condensation, the organic solvent must be capable of furnishing a two-phase system with the second liquid. Such solvents may be selected from those which are used as the solvents in the solution coating compositions containing these various polyesters. The solubility and solution stability will, of course, vary for each polymer with different solvents, and in some instances, mixtures of solvents are preferred. Some of the solvents used for coating compositions include aliphatic and aromatic halogenated hydrocarbons such as chloroform, methylene chloride, ethylene chloride, chlorobenzene; aromatic and aliphatic ketones such as methyl ethyl ketone, cyclohexanone and acetophenone; aromatic hydrocarbons such as benzene, toluene and xylene; di-substituted amides such as dimethyl acetamide; aromatic esters such as phenyl acetate; aliphatic amines such as N-methyl; aromatic amines such as pyridine; aromatic ethers such as dibenzyl ether, diphenyl ether; aliphatic cyclic ethers such as dioxane; phenol; aliphatic and alicyclic sulphoxides and sulphones such as dimethyl sulfoxide, 1,1-dioxytetrahydrothiophene; and unsaturated alkyl aromatics such as styrene. Others include 2-ethoxyethyl acetate, 2-methoxyethyl acetate, 2-butoxy-ethoxyethanol, tetrahydrofuran, diacetane alcohol and N,N-dimethylformamide.

The chlorinated hydrocarbons such as methylene chloride and chloroform are especially preferred both as polymerization solvents and as solvents for the coating compositions. Aromatic solvents such as toluene are also especially useful solvents for forming coating compositions for a variety of these polymers.

The coating compositions of this invention capable of forming clear films which are stable to and absorb ultraviolet light comprise solutions of about 0.5% to about 75% of a polyaromatic polyester in a volatile organic solvent having a boiling point of about 40° C. to about 200° C. These polyesters which have a weight average molecular weight of 3,000 to 200,000 are the reaction product of dihydric compounds having two phenolic hydroxyl groups with at least one unsubstituted position ortho to at least one of the phenolic hydroxyl groups with an aromatic reactive dicarboxy compound. The polymerization of these materials is by means of esterification.

A typical protective coating is of two contiguous, superposed layers; (1) one layer being an aromatic polymer which is a rearranged polyester having stability as well as opacity toward ultraviolet light, said polymer having repeating units of a structural formula:

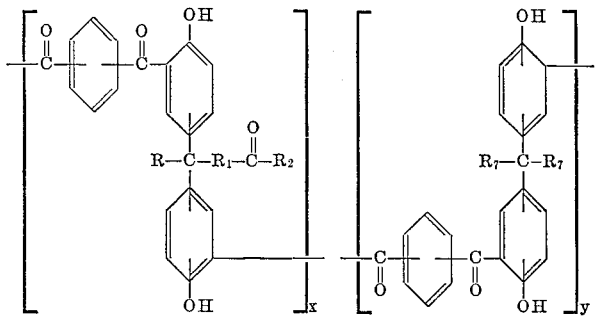

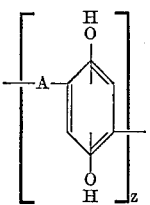

These polymers are formed by rearrangement caused by ultraviolet light of another layer (2) of polyesters of a molecular weight of at least 3,000 having repeating units of a structural formula:

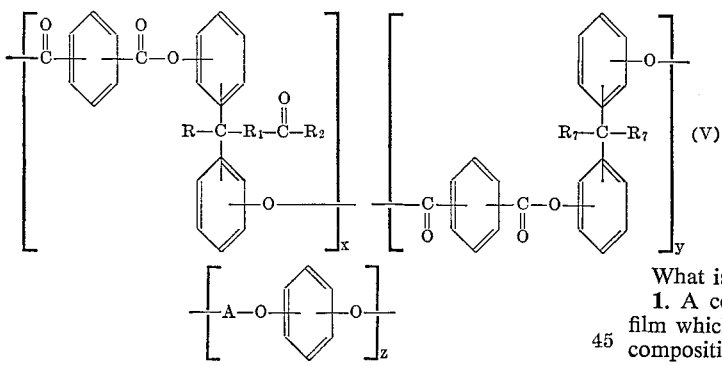

wherein R, $R_1$, $R_2$ and $R_7$ are as heretofore defined, A is the dicarboxylic acid moiety and $n$ is an integer of from 1 to 8, $x$ is an integer of from 5 to 70, $y$ is an integer of from 0 to 65 and $z$ is an integer of from 0 to 65, wherein the total of $y$ and $z$ is not greater than 65, and wherein polymer layer (1) is the layer exposed to the ultraviolet rearrangement product of the polyester (2).

The aromatic polyesters of this invention are soluble in organic solvents. Solutions of these aromatic polyesters form clear adherent continuous coatings, which, on exposure to ultraviolet light rearrange on the exposed surface to form ultraviolet stable layers, which are also opaque to ultraviolet light. These rearranged layers must contain recurring units comprising 2 aromatic groups, such as phenol joined by the carbon of a carbonyl group, at least one of the aromatic groups having a hydroxyl group ortho to the carbonyl linkage. The remaining non-rearranged polyester resin is protected from the ultraviolet light by the rearranged layer. However, on weathering or other removal of the protection of the rearranged layer, the polyester functioning as a reservoir readily forms new rearranged layers on exposure to ultraviolet light.

It is readily seen that in addition to the many uses illustrated above there are innumerable other applications for these unique coating compositions. Polymeric materials, such as vinyl chloride polymers, are especially benefitted by these protective coating compositions. These coating compositions might be applied to fluorescent bulbs in the windows of space vehicles. They may be used as a floor coating or to coat walls, panels, or fixtures. Fabrics such as drapes, and clothing after being dry cleaned, may be beneficially spray coated therewith. A great variety of foams, fiber, metals and films, especially synthetic textile fibers, could be protected with these materials.

Numerous dyed and fluorecent materials can be protected therewith. Color photo transparencies can be protected as well as photo prints. In addition to coatings, laminations such as in the rear windows of convertible automobiles can be considered. They may also be considered for anti-tanning lotions and as protection for automobile finishes. Further, they can be considered as photo-sensitive films for photo printing.

This invention has been described above; however, it is not so limited. Variations and modifications such as pigments, dyes, fillers, resinous additives, stabilizers, may be added to the polyesters or solutions thereof without departing from the spirit or scope of this invention.

What is claimed is:
1. A coating composition capable of forming a clear film which is stable to and absorbs ultraviolet light, said composition comprising:
   an aromatic polyester, having a molecular weight of from 3,000 to 200,000 which is the polymeric reaction product of
   (A) from 10 to 100 parts, based on a total of 100 parts of (A) and (C), of an aromatic dihydric compound having at least one unsubstituted position ortho to one of the aromatic hydroxyl groups wherein the aromatic dihydric compound corresponds to the general structural formula:

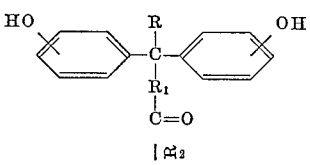

wherein R is selected from the group consisting of hydrogen and alkyl groups of from 1 to 6 carbon atoms, $R_1$ is an alkylene group of from 1 to 10 carbon atoms and $R_2$ is selected from the group consisting of amino, alkoxys of from 1 to 18 carbon atoms, and —$OR_4$,

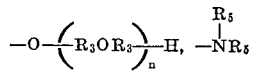

—N=$R_6$, wherein each $R_3$ is an independently selected alkyl group of from 1 to 10 carbon atoms, $R_4$ is an aryl group of from 6 to 10 carbon atoms, each $R_5$ is independently selected from the group consisting of hydrogen, alkyls of from 1 to 6 carbon atoms and aryls of from 6 to 10 carbon atoms; $R_6$ is a divalent aliphatic radical of from 2 to 10 carbon atoms, and $n$ is an integer from 1 to 8;

(B) at least one aromatic dicarboxyl compound capable of esterification, which is selected from the group consisting of aromatic dicarboxyl acids and acid halide derivatives thereof which are selected from the group consisting of unsubstituted and halo and alkyl substituted
  (1) terephthalic acid, isophthalic acid, diphenic acid, binaphthyl dicarboxylic acid;
  (2) the acid halides of the foregoing acids; and
  (3) acids and acid chlorides which correspond to the general structural formula:

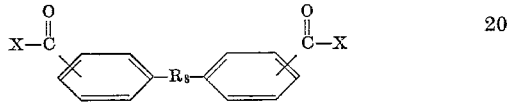

where X is selected from the group consisting of hydroxyl and halide and $R_8$ is selected from the group consisting of methylene, carbonyl, oxygen, sulfur, sulfone, isopropylidene, isobutylidene and ethylidene; and (C) from zero to 90 parts, based on a total of 100 parts of (A) and (C), of an aromatic dihydric compound selected from the group consisting of
  (1) an aromatic dihydric compound having at least one unsubstituted position ortho to an aromatic hydroxyl group, wherein the aromatic dihydric compound corresponds to the general formula:

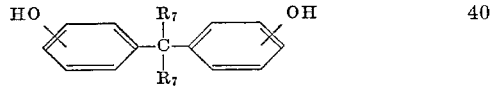

wherein each $R_7$ is independently selected from the group consisting of hydrogen and alkyl groups of from 1 to 8 carbon atoms; and
  (2) a dihydric phenol,
the total quantity of (A) and C being substantially stoichiometrically equivalent to the quantity of (B),
wherein the aromatic polyester is dissolved in a volatile organic solvent having a boiling point range of from about 40° C. to about 200° C., the polyester being from 0.5% to about 75% by weight of the total of polyester and solvent.

2. A coating composition as in claim 1 wherein the organic solvent is a volatile liquid selected from the group consisting of aliphatic and aromatic halogenated hydrocarbons, aromatic and aliphatic ketones, aromatic hydrocarbons, disubstituted acetamides, aromatic esters, aliphatic and aromatic amines, aromatic ethers, aliphatic cyclic ethers, phenol, aliphatic and alicyclic sulphoxides and sulphones, and unsaturated alkyl aromatics.

3. A coating composition as in claim 1 wherein the dicarboxyl compound is a phthalic acid derivative.

4. A coating composition as in claim 1 wherein the aromatic polyester is the coreaction product of the 2-butoxyethanol ester of 4,4-bis(4'-hydroxyphenyl)pentanoic acid and a mixture of isophthalic acid and terephthalic acid.

5. A coating composition as in claim 1 wherein the aromatic polyester is the coreaction product of the lauryl ester of 4,4-bis(4'-hydroxphenyl)pentanoic acid and a mixture of isophthalic acid and terephthalic acid.

6. A coating composition as in claim 1 wherein the aromatic polyester is the coreaction product of resorcinol, the butyl ester of 4,4-bis(4'-hydroxyphenyl)pentanoic acid and a mixture of isophthalic acid and terephthalic acid.

7. A coating composition as in claim 1 wherein the dicarboxyl compound is a mixture of isophthalic and terephthalic acids.

8. A coating composition of forming a clear film which is stable to and absorbs ultraviolet light, said composition comprising:
a rearrangeable polyester having a molecular weight in the range of from 3,000 to 200,000 which comprises the polymeric reaction product of:
(A) from 10 to 100 parts, based on a total of 100 parts of (A) and (C), of an aromatic dihydric compound having at least one unsubstituted position ortho to an aromatic hydroxyl group wherein the aromatic dihydric compound corresponds to the general structural formula:

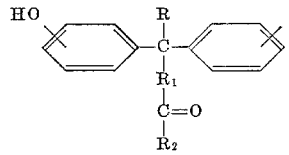

wherein R is selected from the group consisting of hydrogen and alkyl groups of from 1 to 6 carbon atoms, $R_1$ is an alkylene group of from 1 to 10 carbon atoms and $R_2$ is selected from the group consisting of alkoxys of from 1 to 18 carbon atoms, and $-O(R_3OR_3)_nH$, wherein each $R_3$ is an independently selected alkyl group of from 1 to 10 carbon atoms and $n$ is an integer of from 1 to 8, (B) at least one aromatic dicarboxyl compound capable of esterification, which is selected from the group consisting of aromatic dicarboxylic acids with acid halide derivatives thereof which are selected from the group consisting of unsubstituted and halo and alkyl substituted
  (1) terephthalic acid, isophthalic acid, diphenic acid, binaphthyl dicarboxylic acid;
  (2) the acid halides of the foregoing acids; and
  (3) acids and acid chlorides which correspond to the general structural formula:

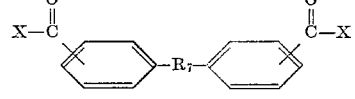

wherein X is selected from the group consisting of hydroxyl and halide and $R_8$ is selected from the group consisting of methylene, corbonyl, oxygen, sulfur, sulfone, isopropylidene, isobutylidene and ethylidene; and (C) from zero to 90 parts, based on a total of 100 parts of (A) and (C), of an aromatic dihydric compound selected from the group consisting of
  (1) an aromatic dihydric compound having at least one unsubstituted position ortho to an aromatic hydroxyl group, wherein the aromatic dihydric compound corresponds to the general formula:

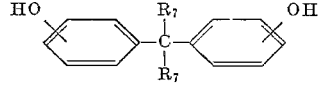

wherein each $R_7$ is independently selected from the group consisting of hydrogen and alkyl groups of from 1 to 8 carbon atoms; and
  (2) a dihydric phenol, the total quantity of (A) and (C) being substantially stoichiometrically equivalent to the quantity of (B);

wherein the aromatic polyester is dissolved in a volatile organic solvent having a boiling point range of from about 40° C. to about 200° C., the polyester being from 0.5% to about 75% by weight of the total of polyester and solvent.

9. A coating composition as in claim 8 wherein the polyester is the coreaction product of the 2-butoxyethanol ester of 4,4-bis(4'-hydroxyphenyl)pentanoic acid and a mixture of isophthalic acid and terephthalic acid.

10. A coating composition as in claim 8 wherein the polyester is the coreaction product of the lauryl ester of 4,4-bis(4'-hydroxyphenyl)pentanoic acid and a mixture of isophthalic acid and terephthalic acid.

11. A coating composition as in claim 8 wherein the polyester is the coreaction product of resorcinol, butyl ester of 4,4-bis(4'-hydroxyphenyl)pentanoic acid and a mixture of isophthalic acid and terephthalic acid.

12. A coating composition as in claim 8 wherein the dicarboxyl compound used to prepare the polyester is a mixture is isophthalic and terephthalic acids.

13. A coating composition as in claim 8 wherein the organic solvent is a volatile liquid selected from the group consisting of aliphatic and aromatic halogenated hydrocarbons, aromatic and aliphatic ketones, aromatic hydrocarbons, disubstituted acetamides, aromatic esters, aliphatic and aromatic amines, aromatic ethers, aliphatic cyclic ethers, phenol, aliphatic and alicyclic sulphoxides and sulphones, and unsaturated alkyl aromatics.

14. A coating composition as in claim 8 wherein the polyester is the coreaction product of resorcinol, lauryl ester of 4,4-bis(4'-hydroxyphenyl)pentanoic acid and a mixture of isophthalic acid and terephthalic acid.

References Cited

UNITED STATES PATENTS

| | | | |
|---|---|---|---|
| 2,907,736 | 10/1959 | Greenlee | 260—22 |
| 2,933,520 | 4/1960 | Bader | 260—473 |
| 3,160,602 | 12/1964 | Kantor et al. | 260—47 |
| 3,309,334 | 3/1967 | Holub | 260—33.2 |
| 3,391,110 | 7/1968 | Coleman | 260—47 |

MORRIS LIEBMAN, Primary Examiner

H. H. FLETCHER, Assistant Examiner

U.S. Cl. X.R.

117—124, 132, 138.5, 138.8, 143, 144, 148, 161; 260—30.8, 31.2, 32.6, 32.8, 33.2, 33.4, 33.6, 33.8, 47, 860

UNITED STATES PATENT OFFICE
CERTIFICATE OF CORRECTION

Patent No. 3,492,261           Dated January 27, 1970

Inventor(s) Raymond H. Young, Jr., Saul M. Cohen, Albert H. Markhart & Irving Serlin It is certified that error appears in the above-identified patent and that said Letters Patent are hereby corrected as shown below:

Column 3, line 62, "hydroxy" should read --- hydroxyl ---.
Column 4, line 71, "ketobibenzoic" should read --- ketodibenzoic ---.
Column 5, line 44 "300 µ" should read --- 300 mµ ---.
Column 5, line 46 "400 µ" should read --- 400 mµ ---.
Column 5, line 48 "450 µ" should read --- 450 mµ ---.
Column 6, line 25 "wshed" should read --- washed ---.
Column 8, Table II, Example 25 "oxydibenxoyl" should read --- oxydibenzoyl -

Column 9, Table IV, insert as last line of Table:

---poly(vinyl alcohol)      96      unchanged      tan, brittle ---

Claim 1, column 15, line 9, "dicarboxyl" should read --- dicarboxylic ---.

Claim 8, Formula I should read:

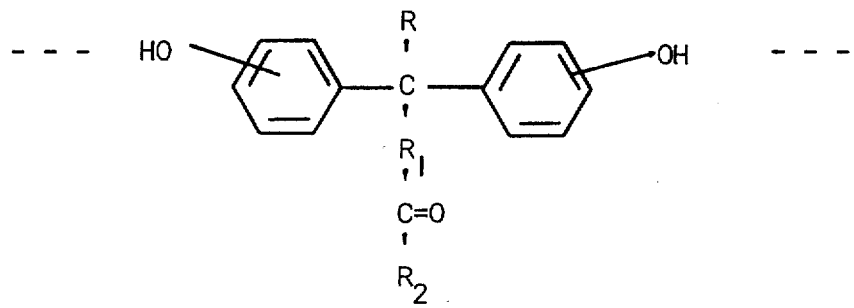

Claim 8, Formula II should read:

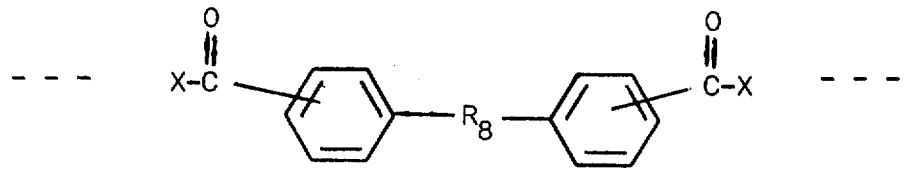

SIGNED AND SEALED
AUG 25 1970

(SEAL)
Attest:

Edward M. Fletcher, Jr.
Attesting Officer

WILLIAM E. SCHUYLER, JR.
Commissioner of Patents